Figure 1:
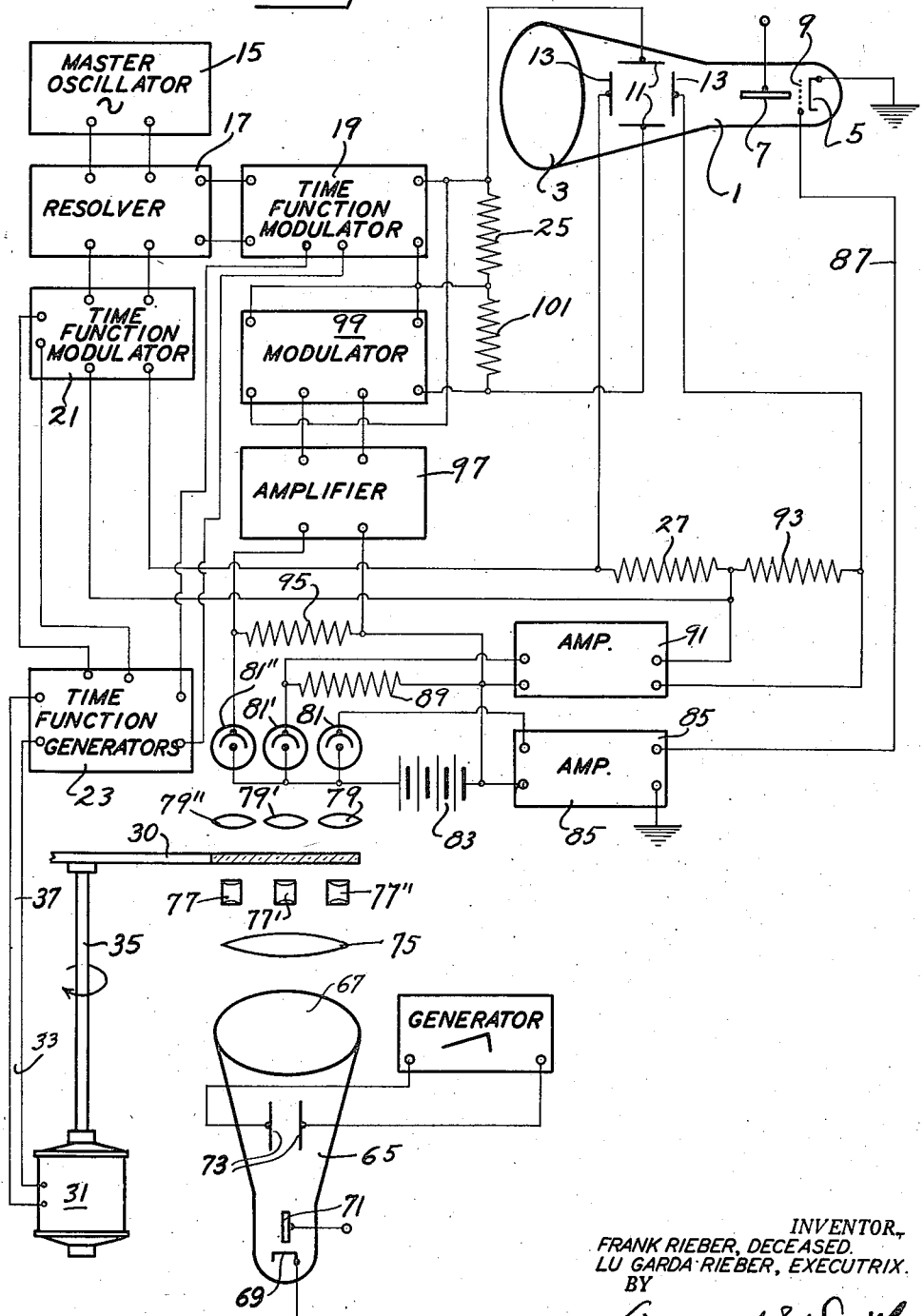

INVENTOR.
FRANK RIEBER, DECEASED.
LU GARDA RIEBER, EXECUTRIX.
BY
Lippincott & Smith
ATTORNEYS.

March 1, 1955    F. RIEBER    2,703,150
GEOPHYSICAL DISPLAY SYSTEM
Filed Sept. 29, 1949    3 Sheets-Sheet 2
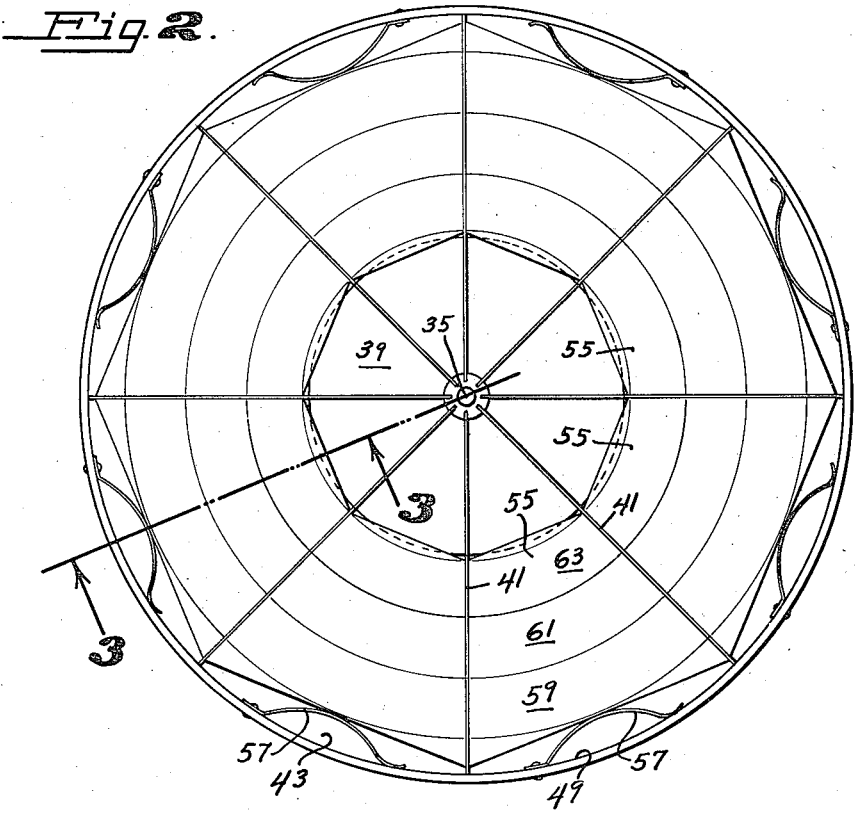
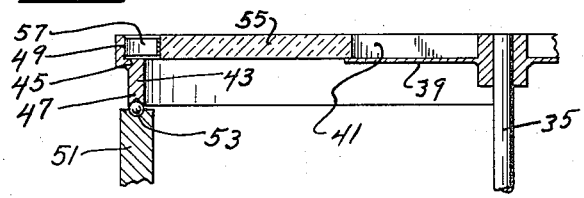
INVENTOR,
FRANK RIEBER, DECEASED.
LU GARDA RIEBER, EXECUTRIX.
BY
ATTORNEYS.

March 1, 1955 F. RIEBER 2,703,150
GEOPHYSICAL DISPLAY SYSTEM
Filed Sept. 29, 1949 3 Sheets-Sheet 3

INVENTOR,
FRANK RIEBER, DECEASED.
LU GARDA RIEBER, EXECUTRIX.
BY
Lippincott & Smith
ATTORNEYS.

United States Patent Office 2,703,150
Patented Mar. 1, 1955

2,703,150

GEOPHYSICAL DISPLAY SYSTEM

Frank Rieber, deceased, late of New York, N. Y., by Lu Garda Rieber, executrix, New York, N. Y., assignor to Geovision, Incorporated, a corporation of New York Application September 29, 1949, Serial No. 118,636

13 Claims. (Cl. 181—0.5)

This invention relates to the display of seismic geophysical data. The invention is an extension of and for some purposes an improvement on the systems disclosed in copending applications Serial No. 53,954, filed October 11, 1948, and now U. S. Patent #2,693,862, granted November 9, 1954, and Serial No. 316,136, a continuation of application Serial No. 65,883, filed December 17, 1948, now abandoned, both of which copending applications cover inventions of this same inventor.

In the aforementioned applications it is shown that if a charge of explosives is fired at a "shot point" above a geophysical mass which is to be explored, thus initiating a seismic wave, the wave will be propagated through the mass and, upon striking a layer having different propagation characteristics from that through which it has been traveling, a portion will be reflected. The reflected wave may be picked up upon a geophone or receptor which has a known geometrical relationship with the shot point, and that if the propagation velocity along the path between the shot point and the receptor is known and constant the time interval between the instant of the explosion and the instant of arrival of the reflected wavefront at the receptor will define an ellipsoidal locus, the foci of which are the shot point and the point of reception, which locus is tangent to any possible reflecting surface or interface which would cause a reflection to reach the receptor within such interval. If waves from the same explosion are received at a plurality of receptors as reflected from the same interface the times of arrival of the same wavefront at the various receptors will define a different locus for each receptor, the ellipsoids representing the different loci having different interfocal distances, different orientations of their axes, or both.

If there now be selected a suitable plane of projection through the mass to be explored this plane will intersect the ellipsoidal loci as plane ellipses. A display surface may be taken to represent the plane of projection which has been chosen, the projections of the shot point and the receptor point upon this plane of projection, represented upon the display surface to some suitable scale, and ellipses representing the loci corresponding to the instance of reception of the waves may be traced upon the display surface. The reflecting interface will be tangent to all of these ellipses, and if the receptor points are not all upon the same line through the shot point these receptor points will define the plane of the reflecting interface. Furthermore, if the plane of projection be selected so that it is perpendicular to the strike of the interface the loci themselves will reinforce or line up so that the distance of the interface from the shot point or other fixed datum and the dip of the interface will at once become apparent.

The above facts are well known and form the basis of all geophysical mapping by reflection seismography. The prior applications mentioned, however, make this display automatic. The fluorescent or phosphorescent screen of a cathode ray tube is used as the display surface. Deflection voltages are applied to this cathode ray tube, these voltages varying with time in such manner as to deflect the cathode ray beam to trace paths which correspond, to scale, to the loci of possible reflecting surfaces which would return reflections to the various receptors at successive instants of time. The cathode ray beam is then modulated by the waves received at the various receptors, with the result that bright (or dark) traces on the screen correspond to loci which are actually tangent to reflecting interfaces. The applications mentioned further show that if the mass through which the seismic waves are propagated is not homogeneous and the velocity is therefore not constant the loci depart to a greater or less degree from the ellipsoidal form. The departure from this form under varying conditions is known and the shape of the paths traced upon the display screen can be modified accordingly. Furthermore, it is unnecessary that the seismic waves be used directly to modulate the intensity of the cathode ray beam; instead, these waves may be phonographically recorded and the records played back to the display device either at the same rate as recorded or, preferably, at a higher rate, the rate of change of the radii of deflection being modified accordingly.

In the prior application Ser. No. 53,954 above mentioned there is shown a multi-gun cathode ray tube which projects a plurality of beams against the same display screen, each beam being deflected in accordance with the geometry of position of a specific receptor with relation to the shot point. In utilizing the equipment there disclosed a number of receptors in one array, the data from which can be handled simultaneously, is quite rigorously limited by the number of cathode ray guns which can be effectively combined into a single tube. In the copending application Serial No. 316,136 there is described and claimed a method for using a single gun cathode ray tube to present the data from a relatively large number of receptors, this preferably being done through the use of phonographic recording of the data and by providing switching means which will permit the records pertaining to each receptor to be successively sampled, and, at the same time, switching into the deflecting system of the cathode ray tube electrical pulses or waves which will shift the mean or "central" position of the cathode ray beam in accordance with the positions of the receptors with respect to the shot point and modify the radii of the paths representing the loci in accordance with the geometry of the ellipses.

The apparatus covered by the second-mentioned application is entirely satisfactory for displaying data resulting from a single seismic shock and the number of receptors the output whereof can be satisfactorily handled is materially increased as compared to the equipment described in said first-mentioned application. Frequently, however, it is desirable to make a combined representation of the data consequent upon a plurality of shots, all occurring in the same area, or, more frequently, to display in a single presentation data consequent upon shots in adjacent areas, this permitting the simultaneous study of a much wider terrain.

Although there is no fixed limitation as to the number of receptors whose output can be handled by a single-gun cathode ray tube and an electronic switching system of only moderate complexity, if the results of a large number of shots, each received by an extended array of geophones, are to be combined, a practical economical limit is soon reached, especially for apparatus to be used in the field. Beyond this limit it becomes necessary to photograph the display surface, and combine the photographs, if a wide analysis is to be examined as a whole.

The purpose of this invention is to provide means for displaying geophysical data in the general manner which has been above described as derived from a large number of receptors, either in the same or in adjacent areas, and from either a single explosion or from a multiplicity of explosions, such display being accomplished without electronic switching equipment and in a manner having a high degree of flexibility.

Any type of phonographically reproducible record represents the variation with time of some single-value variable such as pressure, displacement, acceleration or velocity, and the time function on the record is represented by a distance. The recording and reproduction of such a variable therefore involves two transformations; in the first time is converted to distance along the record and in the second distance is reconverted to time, the conversion, of course, being made by imparting uniform relative motions between the record material and the recording or reproducing head. It follows that any change of dimension of the recording medium, such as a shrinking or stretching of a strip of film, results in a distortion of the time scale. With respect to a single record this may not be serious, since the stretch or shrinkage of the recording medium will ordinarily be so nearly uniform throughout its length or volume that the distortion is proportional throughout and may be compensated for, if necessary, by a change in the speed of drive. The records being made at one time, the factors leading to the change in dimension, such as change in temperature, moisture, or the like, will have a uniform effect throughout. Where, as in the case here under consideration, it is desired to combine recordings which have been made at different times, and where the records may have been made and stored under very different conditions, such distortions of the time scale as between different records may become important. It is, therefore, another object of this invention to provide a type of record and recording and reproducing means therefor wherein changes of dimension in the recording medium will cause no appreciable distortion of the time scale.

Considered broadly, the system of this invention comprises the usual steps of choosing a shot point, laying out a receptor array in known geometrical relation to the shot point and firing the shot to produce the seismic shock which initiates the various wave trains, all in the customary manner. It is, however, of advantage (although not strictly necessary) to lay out the receptor array in what may be termed a "standard" form, i. e., to develop a number of layouts which, between them, will take care of the conditions ordinarily met in the field and in each case to choose a suitable one of such layouts rather than to hand-tailor the array used in each individual case.

When the array has been set up and laid out the charge is fired and the shock initiated. Instead of recording the seismic waves as picked up by the various geophones as seismograms of the ordinary graphic type, however, the output of the geophone is phonographically recorded as one of a plurality of parallel tracks upon the same recording medium. Broadly speaking any method of recording may be used which will permit the various tracks to be cross-scanned, and from a theoretical standpoint this would permit almost any of the known recording methods to be used except the so-called "lateral recording" which represents the recorded wave by a sinuous groove in a mechanical medium. "Hill and dale" mechanical recording could be used, but the practical difficulties of adapting this method to cross-scanning are such that the choice of recording methods would normally be either magnetic or photographic, and since the photographic method permits the record to be scanned by an inertialess light beam this becomes the method of choice. Furthermore, since the records are to be sampled by cross-scanning the period during which the sampling of the records is truly representative of the recorded wave will be longer in the case of a variable density track than it will if the variable area type of recording is used, and hence variable area photographic recording is the method of choice.

As has been indicated the outputs of all geophones are recorded as separate parallel tracks, i. e., tracks which are closely adjacent and wherein the distance from the center of one track to the center of the next is constant throughout the length of all tracks. It is therefore possible to record the tracks on a strip of film which is moved at a constant speed. Since one of the purposes of the invention, however, is to make a record which may be accurately combined with other records made at other times it is preferable to make the parallel tracks as in the form of concentric arcs subtending equal angles on a sector of a circle which subtends materially less than 360°, and to gain the full value of the invention the arc should not be greater than 120° and the optimum value is probably a 45° arc.

The records may be made either on the customary Celluloid or acetate film, which is cut into "pie-shaped" sectors, with an additional tab on the end of the wedge which is perforated to receive a pin for positioning the sector upon the turntable. Alternatively, the recording medium may be a glass photographic plate which is cut into trapezoidal or sectorial form, with the angles nested between pins or guide strips. Similar pins or guide strips should preferably also be provided if film is used.

The advantage of the sectorial form of record is that with this form a time function is represented by an angle rather than by a length. Expansion or contraction of the sector of the circle may change the radius upon which one of the tracks has been recorded, but since the expansion or shrinkage will be the same or very nearly the same in both directions the angle will not change. Hence, when the record is to be reproduced, it is rotated about the same center at the same angular velocity as which it was recorded or in known proportion to such angular velocity, the time still will come out undistorted. Furthermore, a plurality of, say, 45° sectorial records, can be nested between 45° guide fins or pins on a reproducing turntable, and if the recording turntable is operated at the same speed in making all records the time scales of all records will coincide.

The sectorial records thus made are processed in the usual manner. For purposes of display positive transparencies are preferably made of the records, the positives also being of sectorial form.

In accordance with the present invention there is also printed, on the same positive, a second series of parallel phonographically reproducible tracks which correspond in number and in radial spacing to those on the seismograph tracks. These additional tracks are prepared in the laboratory, each track representing or being made in accordance with a geometrical parameter which relates to its corresponding seismograph track and the position of that track with relation to the shot point. The kinds of data that may be represented on these auxiliary tracks are various and the ones that are actually used will depend in some degree upon the amount of data to be presented and the accuracy of presentation required. Thus, for example, if so wide an area is to be depicted that the scale of reproduction becomes very small certain corrections might be unimportant which would be required if the data were to be examined in detail and upon a large scale.

Examples of the data which may be thus recorded upon auxiliary tracks are the displacement of the respective receptors from the shot point (i. e., the fixed displacement which would be applied to determine the centers of the various elliptical loci), the corrections which should be applied to the vertical component of a substantially circular sweep to convert it into an elliptical form, or, in the extreme case, harmonic sine and cosine deflecting components can be recorded in their entirety with their amplitudes varying with time so as to trace out the ellipsoidal loci. The form that these records take will depend upon the particular type of geometrical data which is to be presented thereon. A record of this character representing the center of deflection of the electron beam will take the form of an arc of constant photographic density throughout its length, the density corresponding, either positively or negatively, to the displacement from the center position of the undeflected beam of the projection of the center of the ellipsoidal locus. In the case of the elliptical correction, i. e., the shortening of the vertical component of the radius of deflection in comparison with the horizontal component to trace out the proper ellipse, the track will be of graduated density, preferably increasing from a minimum density (maximum transmission) to a maximum density or minimum light transmission. To accomplish the entire scanning by means of such tracks two modulated sinusoidal waves displaced by ninety electrical degrees would be recorded, the modulation varying between the sine and cosine component so as to generate the proper ellipses. In general, however, it is more convenient to generate those components of the scanning waves as applied to the display tube which are common to all receptor points separately, and to make the auxiliary records represent only the corrections which must be applied to these scanning waves in order to make the display correspond to the geometrical positions of the individual receptors.

The "geometrical" or auxiliary tracks are preferably recorded as photographic negatives, and it is possible and desirable to make sets of such negatives corresponding to each of the standard patterns of geophone arrays. As has been indicated the geometrical records are also preferably recorded in sectorial form, and there is advantage in making the width of the geometrical tracks equal to those of the seismic tracks. Thus if each of the seismic tracks is .1 inch wide so that twenty parallel tracks form a two-inch band on the record, the geometrical tracks should preferably each have the same width and collectively should also form a two-inch band. It is usually preferable also to make the maximum radius of this band smaller than the minimum radius of the seismic track, although it is obvious that these conditions can be reversed. Since, however, the geometrical factors recorded upon the tracks vary less rapidly than the data recorded on the seismic tracks (in the case of the center displacement in the horizontal direction there is no variation at all) greater accuracy is achieved by making the geometrical tracks the smaller in radius.

The geometrical tracks are also preferably recorded photographically in the same manner as the seismic tracks. Prints may be made simultaneously with those of the seismic tracks upon the same plates or films, or they may be made on separate plates or films which can be angularly positioned in the same manner as those already described, overlying the seismic records in the reproducing machines so that, if desired, the scanning parameters may be changed by changing the geometric records only; e. g., to vary the plane of projection of the mass to be explored. It is clear that more than one group of geometrical tracks may be provided. Thus, for example, the final sectorial print could show an outer annular arc of seismic tracks, an intermediate arc whereon are recorded the variations in the vertical component of the deflecting radius necessary to produce the proper ellipticity of the respective loci and an inner group of tracks corresponding to the lateral displacement of the centers of the ellipses.

In the final display the positive prints are fitted on to the turntable or other record support so that the various bands of tracks form substantially continuous annular arcs, preferably forming a complete circle although the latter is not a necessary condition. All groups of tracks are scanned simultaneously and radially while the scanning device and records are moved circumferentially relatively to each other. The procedure of moving a scanning medium transversely across the tracks of a group simultaneously with the relative movement longitudinally along the tracks as a group can conveniently be termed "cross-scanning" and it results in "cross-sampling" the information recorded on the several tracks. The scanning media are three coordinately moved light beams if the photographic method of recording is used, and the coordinate motion can best be applied by the use of a "flying spot" scanner. Three such scanners might be used to accomplish the scanning of three groups of tracks. More effective coordination between the scannings can be obtained, however, by utilizing the single cathode ray tube, so mounted that the single pair of deflecting plates (or coils) which is used are so mounted as to deflect the rays radially with respect to the record support. Between the fluorescent screen of the flying spot scanner and the records there is provided a multiple optical system of the beam-splitting type such as is used in color cameras or in color television practice, the filters which are used in such practice being omitted of course. Such an optical system will provide three images of the flying spot, corresponding to three scanning beams, the motions of all of these being identical so that if the optical systems are adjusted properly with respect to the various groups of tracks when the first beam, scanning the seismic tracks, is centered over a specific track, the other beams will be centered over the geometrical tracks pertaining thereto.

A scanning wave of linear or sawtooth waveform is applied to the flying spot scanner so as to cross-sample all of the groups of tracks while the record is advancing. The frequency of this cross-scanning should be so coordinated with the rate of advance of the record that the highest frequency recorded on the seismic record will be sampled several times during each cycle. The rate of relative motion of the record with respect to the scanning plane need not be that at which the record was made. Preferably it is materially higher. As an example, if the records from eight different arrays are to be combined and each record originally took six seconds to produce it would require forty-eight seconds to scan the entire combination. It is preferable, however, to speed up the entire operation so that all traces upon the display tube will be produced within a time so that all traces will be visible simultaneously upon a display screen of the persistent type; say within one second, representing a 48:1 speed-up of reproduction. If the highest significant frequency recorded on the seismic record be arbitrarily chosen as 85 cycles, and it also be determined, arbitrarily, that each cycle of the 85-cycle frequency is to be sampled at least six times, this will require 510 cycles of the cross-scanning frequency of 24,500 cycles. Since it is assumed that twenty records are to be sampled in each group the minimum frequency of response of the pickup circuits would be 225,000 cycles per second and for the best results this should be doubled. Television practice indicates that such frequencies of response are readily obtainable.

The flying spot scanning tube is mounted on one side of the turntable or other record support above the transparent areas thereof; on the other side of the support (either above or below) there are mounted individual photocells for each group of tracks and suitable optical systems for focusing the images of the portions thereof being scanned upon the photosensitive cathodes of the cells. Suitable amplifiers, either of the usual type or the electron multiplier type are provided for each cell.

The output of the photocell, suitably amplified, is applied to modulate the intensity of the cathode ray beam of the display tube. The output of the other cells is used to deflect the cathode ray beam, either directly, or by modulation of the deflecting potential.

This arrangement has several advantages over the more conventional deflecting and display systems which have been shown in the prior copending applications of the same inventor. Since there is no switching of potentials representing the geometrical parameters a very large number of vacuum tubes is saved and the equipment becomes much less complicated. Since time is represented by an angle instead of by a length, unequal expansion or shrinkage of the records has no effect upon the timing; at most it can affect the radius slightly and if a slight separation is provided between the zones or bands of track this can be compensated automatically by scanning a very slightly wider band than that pertaining to the track. Factors which are common to all tracks, such as variation in velocity of propagation of the seismic waves with depth can be provided electrically, and the individual modulations due to the geometrical positioning of the receptors superimposed upon these common factors phonographically. The time function variation of radius of the loci on the display tube must, of course, be synchronized with the scanning of the group of tracks pertaining to each receptor array. This variation corresponds to a modulation of the two sinusoidal components of the scanning wave. In general this modulation takes the form of a sawtooth envelope, but the term "sawtooth" is here used in a very general fashion, since the modulating form is generally not linear but, because of the increase of wave velocity with depth it approaches more nearly an exponential form.

Figure 4:
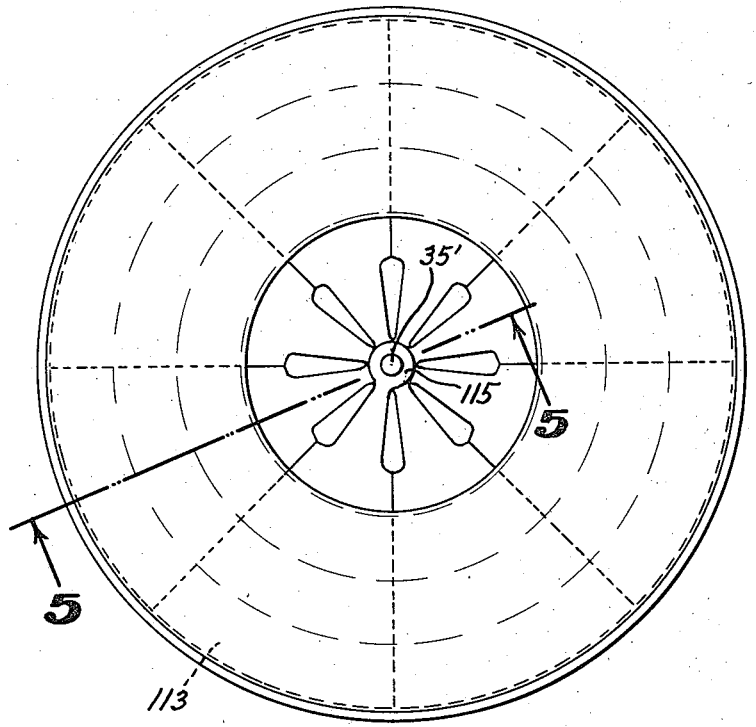
Figure 5:
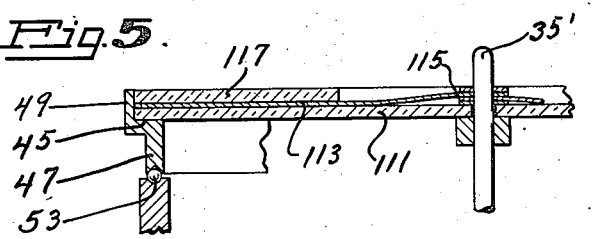

The various figures of the drawing illustrate a preferred embodiment of the invention. In these figures: Fig. 1 is a diagram, partly in block and partly in more complete schematic form, of the system as a whole; Fig. 2 is a plan view of one form of turntable, suitable for carrying glass plate records of the type herein described; Fig. 3 is a fragmentary cross-sectional view through the rim of the turntable, the plane of section being indicated by the line 3—3 in the second figure; and Fig. 4 is a view, generally similar to that of Fig. 2, illustrating a modified form of turntable for use with film records of sectorial form; and Fig. 5 is a fragmentary cross-sectional view of the turntable of Fig. 4.

Referring to Fig. 1 the reference character 1 indicates the display tube on the luminescent screen 3 of which the data are to be presented. This screen is preferably of the persistent type, which will retain a clearly visible trace for an appreciable time, preferably several seconds, after excitation by the cathode ray beam. The tube is provided with the usual thermo-emissive cathode 5, accelerating anode 7, and a control grid 9 for modulating the intensity of the beam of electrons; and may also include second anodes and other devices for focusing the beam, these not being shown as they are well known in the art and unnecessary for the present explanation. The tube is also provided with a deflecting system as indicated in the present instance by the vertical deflecting plates 11 and horizontal deflecting plates 13. Magnetic deflection is also possible, but in the present service is somewhat less convenient.

In the system here chosen for illustration overall deflection is provided by apparatus comprising a master oscillator 15. The sinusoidal output from the oscillator 15 is fed into a resolver 17 which splits it into sine and cosine components. The two components are fed into two time function modulators 19 and 21 respectively.

Modulating components are fed into these two modulators from the time function generators 23. These generators may be of any of the various types which have been described in the above-mentioned copending applications of the same inventor. The waves developed by these generators have a form dependent upon the velocity of the seismic waves in the earth, either as known from previous measurements or assumed, and can vary all the way from a simple sawtooth form, in the unusual case where the velocity is constant with depth, through various exponential or irregular forms where the velocity increases with depth, measured vertically or along an axis which is tilted with respect to the vertical. These factors have previously been discussed in the applications mentioned.

The common factor in all of the forms which may be provided by the time function generators is that there is a continuous increase of voltage (or current) with time throughout a period which corresponds, to scale as it were, with the interval during which the seismic waves resulting from a single shock can be recorded.

In the present example the instrument is intended for the display of waves as recorded on eight different records, and to complete one entire cycle of display in one second; therefore the period of the time function waves is one-eighth of a second. Within the one-eighth second interval, the time function potential increases from zero to the maximum and this being modulated upon the sine and cosine components respectively the envelopes of the latter as modulated by the time function modulators 19 and 21 increase in the same fashion. The waves, thus modulated, are impressed upon a resistor 25 which forms a part of a summing network which is connected to the vertical deflecting plate 11. The modulated output of modulator 21 is similarly applied across a resistor 27 forming one portion of a summing network across which the deflecting plates 13 are connected.

Considering only the potentials supplied from modulators 19 and 21, these two potentials, being applied simultaneously and being generally sinusoidal in form but of constantly increasing amplitude, will spin the cathode ray developed in the tube 1 in a spiral pattern across the screen 3. The frequency of the master oscillator 15 should be so high in comparison with the ⅛-cycle period of the time function oscillator 23 and the rate of increase of potential delivered thereby that the path of the ray over the screen 3 is a spiral of so fine a pitch that any single turn thereof may be considered, without material error, as a circle.

The seismic and geometrical data are fed into the system thus described by a special form of phonographic reproducing device. As shown in the drawing, this comprises a turntable generally indicated by the reference character 30 driven by constant-speed motor 31. The latter motor is preferably of the synchronous type, fed by supply line 33 and is either a multi-pole device operating at sixty revolutions per minute (in the present instance) or is so geared down that its shaft 35 turns at this speed. The time function generator is synchronized with the motor. Synchronism may be either mechanical or electrical. In the present instance it is indicated by synchronizing line 37 connecting from supply line 33 to the time function generator 23. Assuming that the frequency fed to the supply line is sixty cycles, this frequency can be passed into a series of voltage dividers to feed a 7½-cycle synchronizing pulse into the function generators. Again, owing to the various types of function generators which may be used in connection with the current invention, this showing is largely symbolic, for motor-driven potentiometers, either operated by separate synchronous motors, or. more preferably, geared to the motor 31 or the shaft 35 at an 8:1 step-up ratio would equally well provide the potentials required.

The plan of the turntable 30 is shown in some detail in Fig. 2. The table comprises a central hub-disc 39 connected by eight spokes 41 with an annular rim 43. These spokes are in the form of thin strips set vertically, connecting the hub and the rim. The cross-section of the rim comprises, in the present instance, a flat annulus 45 which connects a depending flange 47 and a rising flange 49. The upper surface of the annulus 45 is at the same level as the upper surface of the hub-disc 39. In the particular device shown the diameter of the entire turntable is approximately thirty inches. It is therefore preferred that in order to prevent deflection the outer rim of the table be supported. Such support is provided by the frame 51 of the turntable structure, which is of cylindrical form and is provided with a raceway in its upper edge wherein balls 53 are carried upon which the lower edge of the flange 47 rests.

The size of the turntable and records is largely determined by the frequencies to be reproduced.

The interval during which recognizable records may be received following the seismic shock of the character here considered has a maximum value of about six seconds. The most significant frequencies in the record are the lower ones, in the neighborhood of twenty cycles per second, and an arbitrary limit may be set on the higher frequencies of 85 cycles. As will be shown hereinafter this leads to the choice of a 45° record of sectorial shape whereon the minimum length of track is a little over nine inches, which corresponds to a radius of something less than one foot. If the width of the tracks be taken as 1/10 inch, twenty such tracks placed closely adjacent each other will occupy a band two inches wide and it specifies the maximum radius as a little under fourteen inches. Therefore, in making the records, the recording medium may be placed on a turntable which rotates at an angular velocity of 7½° per second. It is to be understood, however, that the dimensions given are primarily for illustrative purposes, and that widely different values may be used.

The various photographically reproducible records upon which the data has been recorded are in this case glass photographic plates 55 which are trapezoidal in form, their non-parallel edges making an angle of 45° with each other so that they wedge between the spokes 41 of the turntable. When thus positioned the shorter parallel edge of the trapezoid rests upon the hub-disc and the corners of the longer parallel edge of the trapezoid rest upon the annulus 45. Each record is wedged in toward the center of the turntable by a leaf spring 57, and it should be noted that this spring must have considerable strength and as there should be some slight play between the outer corner of the trapezoids and the flange 49 the springs 57 must therefore overcome the considerable centrifugal force exerted upon the plates when the turntable is in operation to hold the records and keep them from shifting in position.

In the present instance each record carries three sets of phonographic tracks arranged in concentric bands. Of these three tracks the outer one 59 carries the seismic data. The next band of tracks 61 carries the corrections proper to the positions of the receptors whose outputs are recorded upon the tracks 59, while the inner band of tracks 63 carry the records corresponding to the elliptical corrections of the various receptors with respect to the shot point as a focus. The tracks are so placed upon the records that they are entirely within the periphery of the annulus 45 and without the periphery of the hub-disc 39 and no mechanical parts are interposed which would prevent the passage of light completely through the records.

Mounted upon one side of the turntable (in this case below it) is a cathode ray tube 65, having an instantaneously responsive screen 67 of the type used in flying spot scanners. This tube has the usual cathode 69 and anode 71. The deflection system, however, need consist only of a single pair of plates 73 or an equivalent coil deflecting system. The tube is so oriented with respect to the turntable that the deflection produced by this system is radial.

Between the cathode ray tube and the turntable there is mounted some form of beam-splitting optical system. Many such systems have been developed for color photography or other uses where multiple images of a single object are required, and the system shown, comprising a collecting lens system 75 plus a plurality of distributing lenses 77, 77' and 77" is merely one of many that can be used. These lenses are so focused and positioned that when the cathode ray beam is deflected through its normal sweep three images of the resultant fluorescent spot will be focused upon the turntable and each spot will sweep across one of the record bands 59, 61 or 63. Each is the image of the same spot and since they are moving through equal amplitudes the various records which pertain to any one geophone will be sampled simultaneously.

Flying spot scanners are obtainable in several sizes. It is of some advantage to use a fairly large screen, say one permitting a seven-inch deflection. With a beam of .01 inch diameter, and focal distances so chosen that the deflection is reduced to a two-inch excursion of the image, the scanning spot is also reduced in the same ratio and is of sufficiently small size to give proper definition when scanning tracks of the dimensions here assumed for illustration. The three bands of tracks are preferably spaced upon the records by approximately the width of one track, and the scanning beam is permitted to overscan each band by an amount which does not exceed this separation. Any expansion or swelling of the record, thermal or otherwise, will affect all of the tracks proportionally, and since the three images of the beam move together any such expansion will not disturb the relationship in any such manner as to refer the geometrical data to the wrong seismic track.

Placed above each of the bands of tracks is an optical system represented by the lenses 79, 79' and 79" which focuses an image of that portion being scanned upon the cathode of a corresponding photocell 81, 81' or 81". All of these photocells may be supplied by common potential source, indicated as the battery 83.

The photocell 81 feeds directly into an amplifier 85, the high potential output of which is connected to a lead 87 and thence to the grid 9 of the cathode ray display tube 1, to modulate the intensity of the beam in accordance with the recorded seismic waves.

Photocell 81' connects across an output resistor 89 which is connected, in turn, across the input of an amplifier 91. This amplifier, in turn, connects across a resistor 93 which, in series with the resistor 27, comprises the summing network which feeds the horizontal deflecting plates 13 of the display tube 1. The photocell 81" connects across a resistor 95 and the potential generated therein feeds an amplifier 97. The amplifier feeds its wave as a modulating component into modulator 99. The "carrier" or modulated potential for this modulator is the sine-function component supplied from the master oscillator 15 by the resolver 17 as already modulated by the time function modulator 19, this potential being taken from the output of the time function modulator as supplied to the resistor 25. This potential, again modulated by the component from the amplifier 97 is imposed across resistor 101 which is in series with the resistor 25 and forms the second portion of the summing network across which the vertical deflecting plates 11 of tube 1 are connected.

In the connections as here described it is assumed that the tracks which combine to form the band 61 are each of constant density throughout their respective lengths as they appear on any individual record, and that this density is a function of the distance of the receptor to which the individual track corresponds from the shot point, or, alternatively, from some norm which may be taken in all shots made as the undeflected position of the cathode ray beam. In either case the exposures of these tracks at the time when they are made is such that the light transmission of the track is a linear function of the displacement of the light spot required to represent to scale the position of the center of the elliptical loci as projected upon the selected picture plane.

The scanning beam as generated by the flying spot tube 65 and its associated optical systems will traverse each track laterally during the period when the corresponding seismic track is being sampled, and the photocell 81', developing a potential which is directly proportional to the transmission of the film, generates a pulse which, amplified by amplifier 91 and fed into resistor 93 is applied across a horizontal deflecting plate to cause a lateral and proportional displacement of the spot which establishes the center about which the deflecting potentials will rotate the beam during the period when this displacement potential is applied.

It may be noted that a track of the character described may be used for this purpose even if no lateral scanning is used, the only requirement being that the photocell feed into a D. C. amplifier. In the form of the invention here described, however, it is not necessary to use a D. C. amplifier since the cross-scanning is so rapid and the interval during which the potential as derived from any individual sound track is so short that there will be no degradation of a signal even through ordinary amplifier circuits comprising series condensers and shunt resistors.

The tracks which comprise band 63 are of different character. As here applied these tracks serve to generate a correcting voltage which, subtracted from the sine component of the potentials used to spin the beam on the display surface 3, will change the circular sweep to elliptical forms with the projections of the receptor and the shot point as foci of the various ellipses. The method of applying such corrections has been explained in detail in the prior applications of the same inventor which have been mentioned hereinabove. In this case the transmission of the track varies continuously along its length and is a function of time which depends upon the distance which separates the shot point and the receptor point and of the velocity of the waves in the medium. Where the velocity is constant the correction factor varies as the time $t$, considered as a distance along the record, minus the square root of the quantity $t^2-t_0^2$ where $t_0$ is the time required for the wave to traverse the distance between the shot point and the receptor point. Since the elliptical correction is most important in the early stages of reception of the train of waves, and since in the present instance the function generated is used to modulate a wave which has already been modulated by the time function generator 23, a close enough approximation will usually be achieved by disregarding the variation of velocity in the deeper layers of the earth and making a record track wherein the transmission varies in accordance with the formula given above. It should be noted, however, it it is quite possible, although not so convenient, to record the time function itself upon a record track and to incorporate the correction factor therein.

When the correction factor is separately recorded as above set forth the transmission of the record may be made either to increase or decrease in accordance with the formula, but in whichever direction the variation takes place it is so applied to modulator 99 from amplifier 97 that the correction is subtractive.

As in the case of the displacement record the time function record is cross-scanned, so that the amplifier 97 need not be of the type which will pass direct current. With variations of the scanning technique, such as would be required if the tracks were each scanned in their entirety and successively (which could be accomplished by making the frequency of the master oscillator 15 quite low in comparison with the other frequencies involved) a very low pass amplifier would be required.

It will be noted that the constant transmission tracks have been shown as placed in the band 61 while the variable density elliptical correction tracks have been placed in the band 63. It would be better practice to reverse the position of these, the parts are diagrammed in the position shown purely for convenience and to avoid cross connections in the drawing.

It should be obvious that the number of bands of tracks is not limited to three. Additional tracks may be recorded either within or without the band of seismic tracks. The nature of such additional bands has already been indicated, for example, the generation of the time functions directly instead of by separate time function generators.

Figs. 4 and 5 indicate a minor modification to the equipment which may be used if film is employed as the recording medium instead of glass plates. In this case the only real difference is in the turntable mounted upon the shaft 35. Film, of course, must be supported throughout its entire surface. This is accomplished by making the turntable disk 111 out of transparent material such as glass or plastic, the glass being preferred because of its resistance to warping. The sectorial records 113 are made in precisely the same manner as the glass records, but in this case, although they may be of trapezoidal form, it is easier to form them as complete sectors of a circle with a tab 115 at the apex of the sector. This tab is perforated so that it fits over the extension 35' of the shaft 35. Stacking the records upon the shaft extension will distort their inner ends slightly, but the total distance which they occupy along the shaft is still small and the peripheries, carrying the bands of track, remain undistorted. A glass or plastic annulus 117 covers the recording portion of the records and holds them flat. Otherwise the device is the same as that already described, the parts being designated by the same reference characters distinguished by accents and it is believed that the structure will be completely evident from the drawing

What is claimed is:

1. Apparatus for displaying geophysical data comprising a cathode ray tube including a display screen, means for directing a beam of cathode rays against said screen, means for deflecting said beam of rays across said screen and means for modulating said beam; a plurality of electrical phonographic pickup means, means for simultaneously moving past each of said respective pickup means a group of parallel phonographic tracks in actuating relationship therewith, connections between one of said pickup means and said beam modulating means, connections between another of said pickup means and said beam deflecting means, and means for repetitively actuating each of said pickup means successively by corresponding tracks of the respective group in actuating relationship therewith for cross-sampling the data recorded thereon.

2. Apparatus for displaying geophysical data comprising a cathode ray tube including a display screen, means for directing a beam of cathode rays against said screen, means for deflecting said beam of rays across said screen and means for modulating said beam; a plurality of electrical phonograph pickup means, means for simultaneously moving past each of said respective pickup means a group of parallel phonographic tracks in actuating relationship therewith comprising a turntable for moving said tracks circumferentially, connections between one of said pickup means and said beam modulating means, connections between another of said pickup means and said beam deflecting means, and means for repetitively actuating each of said pickup means successively by the corresponding tracks of the respective group in actuating relationship therewith comprising means for moving a plurality of scanning elements radially across said track.

3. Apparatus for displaying geophysical data phonographically recorded by the photographic method comprising a cathode ray tube including a display screen, means for directing a beam of cathode rays against said screen, means for deflecting said beam of rays across said screen and means for modulating said beam; a second cathode ray tube having a fluorescent screen and means for deflecting a cathode ray beam thereacross in one dimension to produce a luminous trace across said screen, an optical system provided with ray splitting means for producing a plurality of alined images of said trace, means for simultaneously moving groups of parallel phonographic tracks longitudinally in the plane of each of said images, each of said images in its deflection scanning transversely the tracks of one of said groups, and a photoelectric cell positioned to be affected by the illumination of each of said images as modulated by the tracks of the respective group across which it is deflected, to excite each of said cells repetitively and successively by the various tracks of a respective one of said groups, means actuated by one of said cells for controlling the ray-deflecting means of said first mentioned cathode ray tube, and means actuated by another of said cells for modulating the intensity of the cathode ray beam of said first mentioned tube.

4. The method of displaying seismic data on a cathode ray tube screen which comprises the steps of making a phonographic record of said data, making a second phonographic record representative of geometric parameters affecting the interpretation of said data, simultaneously reproducing said records to generate trains of electric waves corresponding to the data recorded, generating a beam of cathode rays directed against said screen and applying one of said trains to vary the intensity of said beam and another of said trains to deflect said beam.

5. The method of displaying seismic data on a cathode ray tube screen which comprises the steps of making a photo-phonographic record of said data in the form of parallel tracks, the light transmitting value along said tracks varying along said tracks in substantial accordance with the variation with time of the quantity recorded, making a second phonographic record in the form of parallel tracks the light-transmitting value along each of which is substantially proportional to a geometrical parameter relating to a corresponding one of said first-mentioned tracks at a proportional distance along the same, simultaneously cross-scanning said tracks to generate trains of electric waves simultaneously representative of the values recorded on corresponding tracks at proportional distances along the same, generating a cathode ray beam directed at said screen, and applying one of said trains of electric waves to vary the intensity of said beam and another of said trains to vary the deflection of said beam.

6. The method in accordance with claim 5 which includes the step of additionally deflecting said beam in a spiral path of continuously varying radius, said second-mentioned train of wave being applied to vary the position of the center of curvature of said spiral path.

7. The method in accordance with claim 5 which includes the step of additionally deflecting said beam in a spiral path of continuously varying radius, said second-mentioned wave being applied to change one component of said radius.

8. Geophysical display apparatus comprising a turntable provided with means for holding a plurality of sectorial phonographically reproducible records in substantially contiguous relationship, a plurality of phonographic pickup means for radially scanning a plurality of annular bands on such sectorial records disposed around said turntable, and means for relatively rotating said turntable and said scanning means to produce separate trains of electric waves from tracks positioned in each of said bands whereby each of said pickup means is adapted to be repetitively actuated in succession by a plurality of phonographic tracks occupying said band, a cathode ray tube including a display screen, an electron gun for directing a beam of cathode rays against said screen, means for modulating the intensity of said beam and means for deflecting said beam bidimensionally; connections between one of said pickup means and said beam-modulating means and connections between other of said pickup means and said beam-deflecting means.

9. Geophysical display apparatus comprising means for holding a phonographically reproducible record comprising a plurality of groups of tracks, a plurality of phonographic pickup means positioned to cross-scan transversely of the direction of said tracks bands across said records corresponding to the positions of said tracks, and means for relatively moving said record-holding means and said pickup means to produce separate trains of electric waves from tracks positioned in each of said bands, a cathode ray tube including a display screen, an electron gun for directing a beam of cathode rays against said screen, means for modulating the intensity of said beam and means for deflecting said beam bidimensionally; connections between one of said pickup means and said modulating means and connections between other of said pickup means and said deflecting means.

10. Geophysical display apparatus comprising means for holding a phonographically reproducible record comprising a plurality of groups of tracks, a plurality of phonographic pickup means positioned to cross scan bands across said records corresponding to the positions of said tracks to actuate said pickup means repetitively and successively by successive tracks within said band, and means for relatively moving said holding means and said pickup means to produce separate trains of electric waves from tracks positioned in each of said bands, a cathode ray tube including a display screen, an electron gun for directing a beam of cathode rays against said screen, means for modulating the intensity of said beam and means for deflecting said beam bidimensionally, connections between one of said pickup means and said modulating means, means for generating two electrical sine waves in quadrature, means for modulating said quadrature waves to an approximately saw-tooth envelope and connections for applying said quadrature components respectively to said bidimensional deflecting means to produce a spiral scanning pattern, and means connected to other said pickup means for modifying said scanning pattern in accordance with the output of the pickup means so connected.

11. Geophysical display apparatus comprising a turntable and means for holding a plurality of sectorial records in substantially contiguous relationship on said turntable, each of said sectorial records comprising a plurality of groups of substantially uniformly spaced arcuate tracks, a plurality of pickup means each positioned to be actuated by the tracks of one of said groups and means for effectively scanning the tracks of said groups radially by a respective pickup means in order to excite said pickup means repetitively and successively by the various tracks of the respective groups, means for rotating said turntable to produce separate trains of electric waves by actuation of said pickup means to produce separate trains of electric waves from the tracks in each of said groups; a cathode ray tube including a display screen, an electron gun for directing a beam of cathode rays against said screen, means for modulating the intensity of said beam and means for deflecting said beam bidimensionally; connections between one of said pickup means and said modulating means and connections between other of said pickup means and said deflecting means.

12. Geophysical display apparatus comprising a turntable including light transmitting areas and means for retaining sectorially-shaped records in the form of photographic transparencies over said areas substantially contiguously, means for cross scanning a plurality of concentric bands each corresponding to a group of phonographically reproducible tracks on such records comprising a flying-spot scanner, beam-splitting means positioned to direct a plurality of scanning light beams derived from said scanner through said areas and said records and repetitively deflecting each of said beams substantially radially across a respective one of said bands, and a plurality of photoelectric elements positioned to receive light from the respective beams as modified successively and repetitively by the various tracks of each group, a cathode ray tube including a display screen and means for developing a beam of cathode rays, means for deflecting said cathode ray beam bidimensionally across said display screen, means actuated by one of said photoelectric means for modulating the intensity of said cathode ray beam, and means actuated by another of said photoelectric means for controlling the deflection of said cathode ray beam.

13. The method of displaying in correlation geophysical data pertaining to a plurality of receptors in each of a plurality of adjacent areas which comprises the steps of recording the data pertaining to each of said areas on a separate phonographically-reproducible record of sectorial form as a plurality of parallel tracks each of which is an arc of a circle normally intersecting the radii bounding the sectorial record, similarly recording as a like plurality of arcuate tracks subtending like angles geometric data pertaining to the individual receptors of each area, fitting said records together so that the tracks on adjacent records form a substantially continuous circular curve, cross-scanning the said tracks of both groups to sample simultaneously data recorded on the tracks relating to the same receptors and advancing the position of samplings along said tracks and from record to record, generating a beam of cathode rays, modulating the intensity of said beam in accordance with the samplings of said first-mentioned tracks and deflecting said beam in accordance with the samplings of said second-mentioned tracks.

References Cited in the file of this patent

UNITED STATES PATENTS

| | | |
|---|---|---|
| 1,786,812 | Zworykin | Dec. 30, 1930 |
| 2,014,528 | Keller | Sept. 17, 1935 |
| 2,037,577 | Harries | Apr. 14, 1936 |
| 2,241,027 | Bumstead | May 6, 1941 |
| 2,261,848 | Goldmark | Nov. 4, 1941 |
| 2,300,999 | Williams | Nov. 3, 1942 |
| 2,402,058 | Loughren | June 11, 1946 |
| 2,403,986 | Lacy | July 16, 1946 |
| 2,477,640 | Montague | Aug. 2, 1949 |